US012812290B2

(12) United States Patent
Fu

(10) Patent No.: US 12,812,290 B2
(45) Date of Patent: Nov. 24, 2026

(54) EARPHONES WITH VIBRATION PANEL CONNECTED AUXILIARY STRUCTURE

(71) Applicant: SHENZHEN SHOKZ CO., LTD., Shenzhen (CN)

(72) Inventor: Junjiang Fu, Shenzhen (CN)

(73) Assignee: SHENZHEN SHOKZ CO., LTD., Shenzhen (CN)

( * ) Notice: Subject to any disclaimer, the term of this patent is extended or adjusted under 35 U.S.C. 154(b) by 158 days.

(21) Appl. No.: 18/649,015

(22) Filed: Apr. 29, 2024

(65) Prior Publication Data

US 2024/0348971 A1 Oct. 17, 2024

Related U.S. Application Data

(63) Continuation of application No. PCT/CN2022/101073, filed on Jun. 24, 2022.

(51) Int. Cl.
*H04R 1/28* (2006.01)
*H04R 1/10* (2026.01)

(52) U.S. Cl.
CPC ......... *H04R 1/2811* (2013.01); *H04R 1/1008* (2013.01); *H04R 1/2803* (2013.01)

(58) Field of Classification Search
CPC .. H04R 1/2811; H04R 1/1008; H04R 1/2803; H04R 5/033; H04R 9/066; H04R 2460/13; H04R 1/1075
See application file for complete search history.

(56) References Cited

U.S. PATENT DOCUMENTS

| | | | |
|---|---|---|---|
| 8,363,870 B2 | 1/2013 | Asnes | |
| 2006/0165246 A1 | 7/2006 | Lee et al. | |
| 2019/0014425 A1 * | 1/2019 | Liao | H04R 25/606 |

FOREIGN PATENT DOCUMENTS

| | | |
|---|---|---|
| CN | 102497611 A | 6/2012 |
| CN | 104936108 A | 9/2015 |
| CN | 105101020 A | 11/2015 |
| CN | 112751544 A | 5/2021 |
| CN | 214708013 U | 11/2021 |

(Continued)

OTHER PUBLICATIONS

International Search Report in PCT/CN2022/101073 mailed on Mar. 10, 2023, 6 pages.

(Continued)

*Primary Examiner* — Mark Fischer
(74) *Attorney, Agent, or Firm* — METIS IP LLC

(57) ABSTRACT

The present disclosure provides an earphone comprising a support component and a core module connected with the support component. The support component configured to support the core module to be worn to a wearing position. The core module includes a core housing, a transducer device, and a vibration panel. The transducer device is disposed in an accommodating cavity of the core housing. The vibration panel is connected with the transducer device and configured to transmit a mechanical vibration generated by the transducer device to a user. The core module further includes an auxiliary structure connected with the vibration panel. The auxiliary structure may be configured such that a first frequency response curve of a vibration of the vibration panel in a non-wearing state has a first resonance valley in a target frequency range.

20 Claims, 8 Drawing Sheets

(56) References Cited

FOREIGN PATENT DOCUMENTS

| | | | |
|---|---|---|---|
| CN | 115334435 | A | 11/2022 |
| EP | 3337185 | A1 | 6/2018 |
| JP | 2007150871 | A | 6/2007 |

OTHER PUBLICATIONS

Written Opinion in PCT/CN2022/101073 mailed on Mar. 10, 2023, 6 pages.

The Extended European Search Report in European Application No. 22947382.2 mailed on Dec. 18, 2024, 7 pages.

First Office Action in Chinese Application No. 202210729003.3 mailed on Mar. 26, 2026, 13 pages.

* cited by examiner

EARPHONES WITH VIBRATION PANEL CONNECTED AUXILIARY STRUCTURE

CROSS REFERENCE TO RELATED APPLICATIONS

The application is a continuation of International Application No. PCT/CN2022/101073, filed on Jun. 24, 2022, the contents of which are incorporated herein by reference.

TECHNICAL FIELD

The present disclosure relates to the technical field of electronic devices, and in particular to earphones.

BACKGROUND

With the continuous popularization of electronic devices, electronic devices have become indispensable social and entertainment tools in people's daily life, and people's requirements for electronic devices are also getting higher. Electronic devices, such as earphones, have also been widely used in people's daily life, which can be used with cell phones, computers, and other terminal equipment to provide users with an auditory feast of hearing. Earphones generally can be divided into air-conducting earphones and bone-conducting earphones according to the working principle of the earphones. Earphones can also be divided into headphones, on-ear headphones, and in-ear headphones according to wearing modes of the users. Earphones can be further divided into wired earphones and wireless earphones according to interaction modes between earphones and electronic devices.

SUMMARY

The embodiments of the present disclosure provide an earphone. The earphone may include a support component and a core module connected with the support component. The support component may be configured to support the core module to be worn to a wearing position. The core module may include a core housing, a transducer device, and a vibration panel. The transducer device may be disposed in an accommodating cavity of the core housing. The vibration panel may be connected with the transducer device and configured to transmit a mechanical vibration generated by the transducer device to a user. The core module may further include an auxiliary structure connected with the vibration panel. The auxiliary structure may be configured such that a first frequency response curve of a vibration of the vibration panel in a non-wearing state has a first resonance valley in a target frequency range.

According to the earphone provided in the present disclosure, the auxiliary structure may be connected with the vibration panel, and a vibration magnitude of the vibration panel in the target frequency range may be reduced by resonance of the auxiliary structure, so that the vibration amplitude of the vibration panel in the target frequency range can be adjusted, thereby adjusting the frequency response curve of the vibration of the vibration panel.

The embodiments of the present disclosure provide an earphone. The earphone may include support component and a core module connected with the support component. The support component may be configured to support the core module to be worn to a wearing position. The core module may include a core housing, a transducer device, and a vibration panel, the transducer device may be disposed in an accommodating cavity of the core housing. The vibration panel may be connected with the transducer device and configured to transmit a mechanical vibration generated by the transducer device to a user. The core module may further include an auxiliary panel connected with the vibration panel. In a non-wearing state, a first frequency response curve of a vibration of the vibration panel and a second frequency response curve of a vibration of the auxiliary panel may have an intersection point. In a range of at least a portion of frequency range in which a frequency is less than a reference frequency corresponding to the intersection point, a vibration amplitude of the second frequency response curve may be greater than a vibration amplitude of the first frequency response curve. In a range of at least a portion of frequency range in which the frequency is greater than the reference frequency, the vibration amplitude of the first frequency response curve may be greater than the vibration amplitude of the second frequency response curve.

According to the earphone provided in the present disclosure, the auxiliary panel mainly has a relatively great influence on the vibration of the vibration panel in the frequency range of which the frequency is less than the reference frequency corresponding to the intersection point between the first frequency response curve of the vibration of the vibration panel vibration and the second frequency response curve of the vibration of the auxiliary panel, so as to make a targeted local adjustment to the frequency response curve of the vibration of the vibration panel.

The embodiments of the present disclosure provide an earphone. The earphone may include a support component and a core module connected with the support component. The support component may be configured to support the core module to be worn to a wearing position. The core module may include a core housing, a transducer device, and a vibration panel. The transducer device may be disposed in an accommodating cavity of the core housing. The vibration panel may be connected with the transducer device and configured to transmit a mechanical vibration generated by the transducer device to a user. The core module may further include an auxiliary panel and an elastic member connecting the auxiliary panel with the vibration panel.

According to the earphone provided in the present disclosure, the auxiliary panel may resonate at a certain frequency, so that a tingling sensation caused by the vibration of the vibration panel can be attenuated in middle and low frequency ranges in which frequencies are relatively low, or sound leakage caused by the vibration of the vibration panel can be attenuated in a high frequency range of which a frequency is relatively high. In addition, air-conducted sound generated by the auxiliary panel can also compensate for bone-conducted sound generated by the vibration panel.

BRIEF DESCRIPTION OF THE DRAWINGS

In order to more clearly illustrate the technical solutions in the embodiments of the present disclosure, the accompanying drawings to be used in the description of the embodiments will be briefly introduced below. It is obvious that the following drawings are only some of the embodiments of the present disclosure, and for those having ordinary skills in the art, other drawings can be obtained according to these drawings without creative labor.

DETAILED DESCRIPTION

The present disclosure is further described in details below with reference to the accompanying drawings and the embodiments. In particular, it should be noted that the following embodiments are only used to illustrate the present disclosure, but do not limit the scope of the present disclosure. Similarly, the following embodiments are only part of the embodiments of the present disclosure rather than all of the embodiments. All other embodiments obtained by those having ordinary skills in the art without creative labor fall in the scope of protection of the present disclosure.

The "embodiments" in the present disclosure mean that particular features, structures, or characteristics described in combination with the embodiments may be included in at least one embodiment of the present disclosure. It should be understood by those having ordinary skills in the art, both explicitly and implicitly, that the embodiments described in the present disclosure may be combined with other embodiments.

Figure 2:
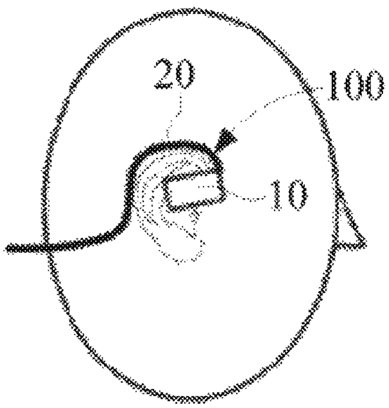
FIG. 2 is a schematic diagram illustrating an exemplary wearing mode of an earphone according to some embodiments of the present disclosure.
Figure 3:
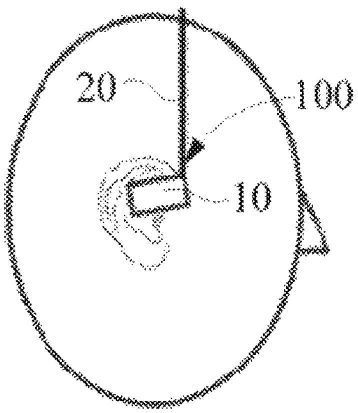
FIG. 3 is a schematic diagram illustrating an exemplary wearing mode of an earphone according to some embodiments of the present disclosure.
Figure 4:
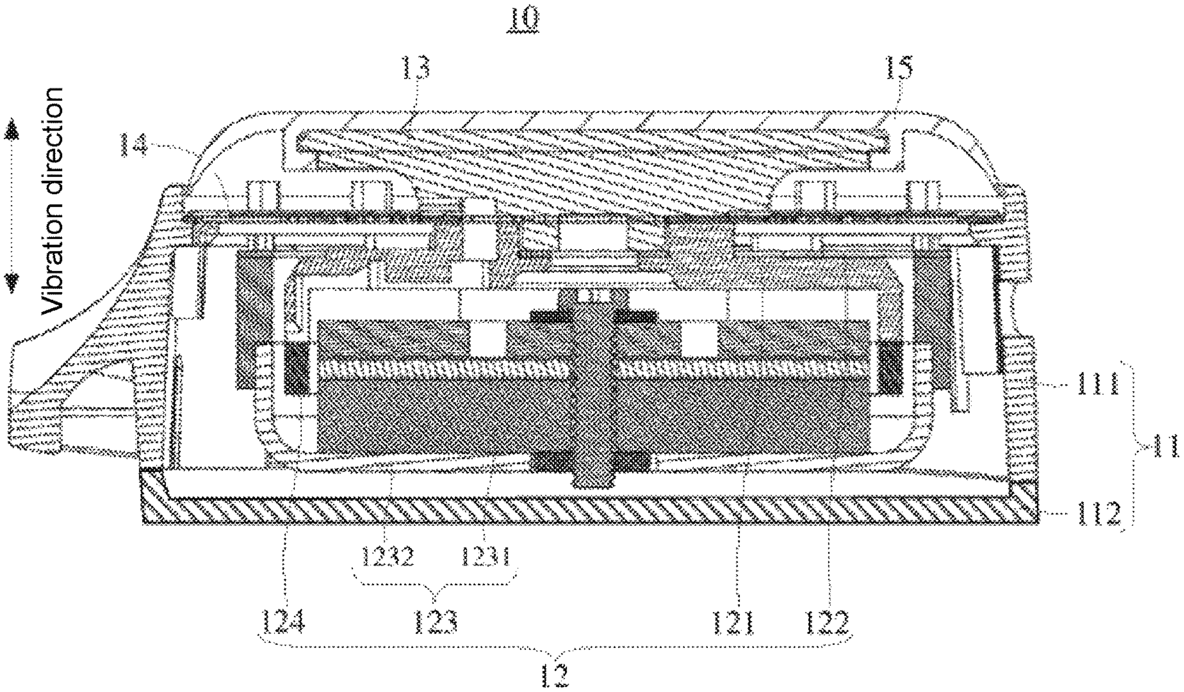
FIG. 4 is a schematic structural diagram illustrating an exemplary core module according to some embodiments of the present disclosure.

Referring to FIGS. 1-3 and FIG. 4, FIGS. 1-3 are schematic diagrams illustrating exemplary wearing modes of an earphone according to some embodiments of the present disclosure. FIG. 4 is a schematic structural diagram illustrating an exemplary core module according to some embodiments of the present disclosure.

In the present disclosure, an earphone 100 may be an electronic device such as a music earphone, a hearing aid earphone, a bone-conducting earphone, a hearing aid, audio glasses, a VR device, an AR device, or the like.

Figure 1:
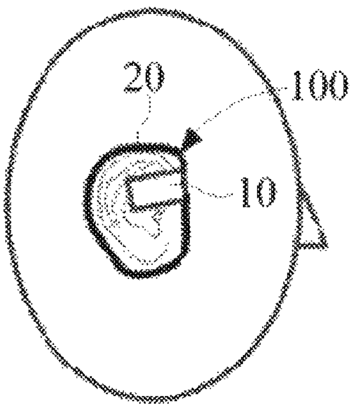
FIG. 1 is a schematic diagram illustrating an exemplary wearing mode of an earphone according to some embodiments of the present disclosure.

Referring to FIGS. 1-3, the earphone 100 may include a core module 10 and a support component 20. The core module 10 may be connected with the support component 20. The core module 10 may be configured to convert an electrical signal into a mechanical vibration so as to be used for hearing a sound through the earphone 100. The support component 20 may be configured to support the core module 10 to be worn to a wearing position. The wearing position may be a specific position on a head of a user, such as a mastoid process, a temporal bone, a parietal bone, a frontal bone, or the like, of the head, and positions of left and right sides of the head located on a front side of ears of the user on a sagittal axis of a human body. Furthermore, a core vibration generated by the core module 10 may be transmitted primarily through a medium such as a skull of the user (i.e., bone conduction) to form a bone-conducted sound, or may be transmitted primarily through a medium such as air (i.e., air conduction) to form an air-conducted sound. The support component 20 may be provided in a ring shape and disposed around the ears of the user, as illustrated in FIG. 1. The support component 20 may also be provided as an on-ear and rear-mounted structure cooperating to be disposed around a rear side of the head, as illustrated in FIG. 2. The support component 20 may also be provided as a headband structure and disposed around a top of the head of the user, as illustrated in FIG. 3.

It should be noted that two core modules 10 may be provided. The two core modules 10 may convert the electrical signal into the core vibration, mainly for realizing a stereo sound by the earphone 100. Therefore, in some application scenarios in which the requirements for the stereo sound are not particularly high, such as a hearing aid for a hearing patient, a live teleprompter for a host, or the like, the earphone 100 may also be provided with only one core module 10.

Merely by way of example, the support component 20 may include two on-ear components and a rear-mounted component. Two ends of the rear-mounted component may be connected with one end of one corresponding on-ear component, respectively, and the other end of each on-ear component away from the rear-mounted component may be connected with one corresponding core module 10. Furthermore, the rear-mounted component may be provided in a curved shape for wrapping around the rear side of the head of the user. The two on-ear components may be provided in a curved shape for hanging between the ears and the head of the user, thereby the wearing requirements of the earphone. In this case, when the earphone 100 is in a wearing state, the two core modules 10 may be located on the left side and the right side of the head of the user, respectively, and the two core modules 10 may also compress the head of the user under the cooperation with the support component 20, and the user is able to hear sound output from the earphone 100.

Referring to FIG. 4, the core module 10 may include a core housing 11, a transducer device 12, and a vibration panel 13. The transducer device 12 may be disposed in an accommodating cavity of the core housing 11. The vibration panel 13 may be connected with the transducer device 12 and configured to transmit a mechanical vibration generated by the transducer device 12 to a user. The transducer device 12 may be configured to convert an electrical signal into the mechanical vibration under an energized state. The vibration panel 13 may be in contact with a skin of the user in a wearing state to act on an auditory nerve of the user by using bones and tissues of the user as media, thereby creating bone-conducted sound.

Furthermore, the core module 10 may further include a vibration damping plate 14. The housing 11 and the vibration panel 13 may be elastically connected through the vibration damping plate 14, i.e., the transducer device 12 may be suspended in the accommodating cavity of the core housing 11 through the vibration damping plate 14. In this case, the mechanical vibration generated by the transducer device 12 may be less or even not be transmitted to the core housing 11 due to the vibration damping plate 14, so as to prevent the core housing 11 from driving air outside the earphone 100 to vibrate as far as possible, thereby reducing sound leakage of the earphone 100.

Furthermore, the core module 10 may further include a face fitting sleeve 15 connected with the vibration panel 13. The face fitting sleeve 15 may be configured to be in contact with the skin of the user, i.e., the vibration panel 13 may be in contact with the skin of the user through the face fitting sleeve 15. A Shore hardness of the face fitting sleeve 15 may be less than a Shore hardness of the vibration panel 13, i.e., the face fitting sleeve 15 may be softer than the vibration panel 13. For example, the face fitting sleeve 15 may be made of a soft material such as silicone, and the vibration panel 13 may be made of a hard material such as polycarbonate, or glass fiber reinforced plastic, so as to improve wearing comfort of the earphone 100 and make the core module 10 further fit the skin of the user, thereby improving the sound quality of the earphone 100. Furthermore, the face fitting sleeve 15 may be detachably connected with the vibration panel 13 for easy replacement by the user.

Merely by way of example, the core housing 11 may include a barrel 111 and a back plate 112 connected with the barrel 111. The barrel 111 and the back plate 112 may be enclosed to form the accommodating cavity of the core housing 11. A stiffness of the back plate 112 may be greater than a stiffness of the barrel 111 to cause a leakage sound generated by the back plate 112 to be shifted toward a relatively high frequency range as much as possible.

Furthermore, the transducer device 12 may include a bracket 121, a vibration transmitting plate 122, a magnetic circuit system 123, and a coil 124. The vibration transmitting plate 122 may be configured to connect the bracket 121 with the magnetic circuit system 123 to suspend the magnetic circuit system 123 in the accommodating cavity of the core housing 11. The coil 124 may extend into a magnetic gap of the magnetic circuit system 123 along a vibration direction of the transducer device 12. The magnetic circuit system 123 may include one or more magnets 1231 cascaded along the vibration direction of the transducer device 12 and a magnetically conductive shield 1232 surrounding the one or more magnets 1231 to concentrate a magnetic field generated by the magnetic circuit system 123 in the magnetic gap. Correspondingly, the vibration damping plate 14 may be configured to connect the bracket 121 with the core housing 11 to suspend the transducer device 12 in the accommodating cavity of the core housing 11. The vibration panel 13 may be connected with the bracket 121.

Figure 5:
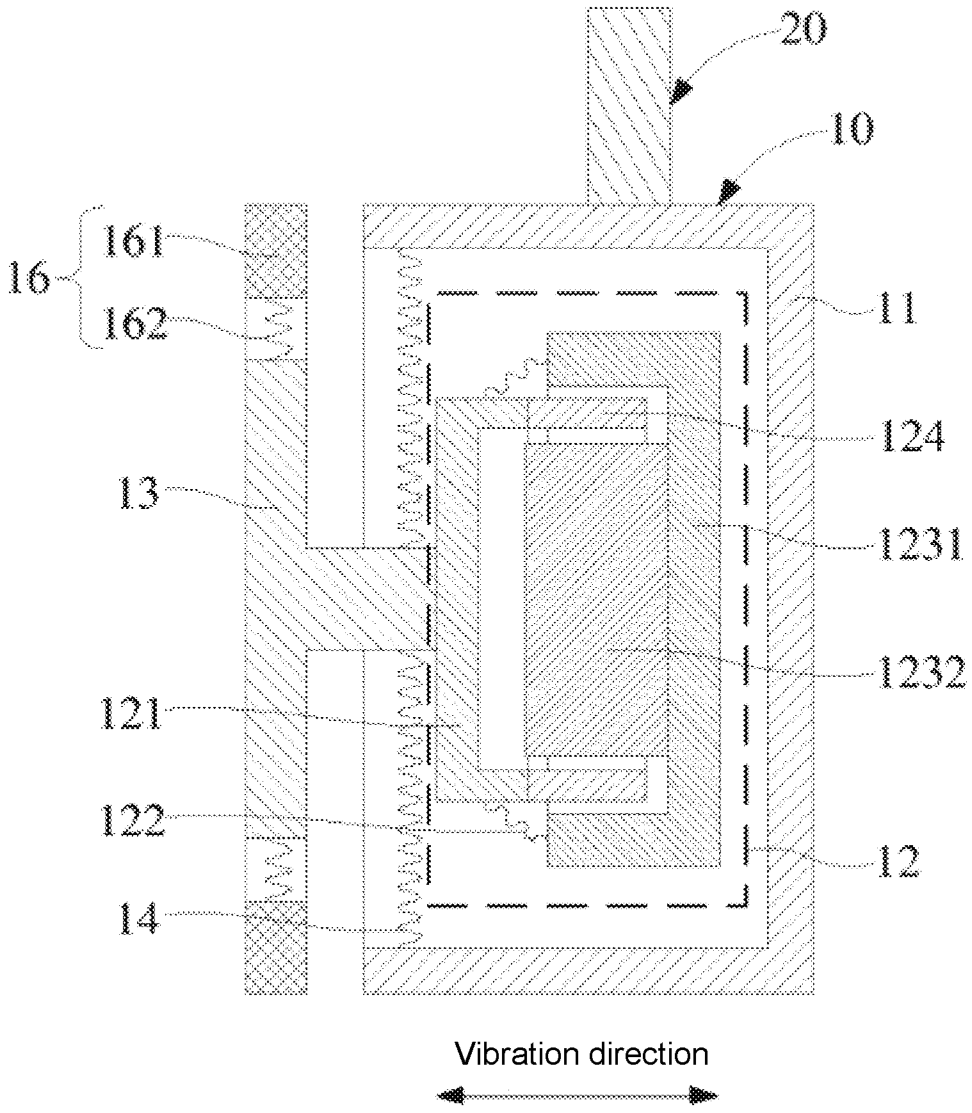
FIG. 5 is a schematic structural diagram illustrating an exemplary core module according to some embodiments of the present disclosure.
Figure 6:
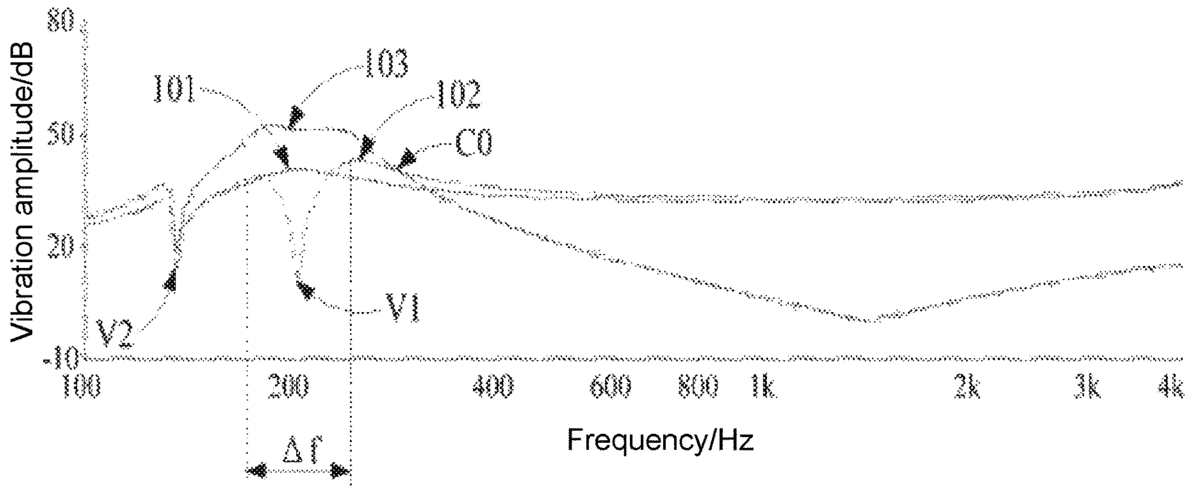
FIG. 6 is a schematic diagram illustrating exemplary frequency response curves of a core module according to some embodiments of the present disclosure.

Referring to FIG. 5 and FIG. 6, FIG. 5 is a schematic structural diagram illustrating an exemplary core module according to some embodiments of the present disclosure. FIG. 6 is a schematic diagram illustrating exemplary frequency response curves of a core module according to some embodiments of the present disclosure.

Referring to FIG. 4 and FIG. 6, in a non-wearing state, the vibration panel 13 may have a frequency response curve 101 during vibration. In the non-wearing state, a vibration displacement (i.e., a vibration amplitude) of the vibration panel 13 may be measured based on a laser triangulation method. The vibration displacement of the vibration panel 13 can be converted into an acceleration of the vibration panel 13, which in turn can be converted into the vibration magnitude of the vibration panel 13 to obtain the frequency response curve of the vibration of the vibration panel 13. In the present disclosure, a horizontal coordinate of the frequency response curve may represent a frequency in Hz, and a vertical coordinate of the frequency response curve may represent the vibration magnitude in dB.

Merely by way of example, a laser vibrometer may emit a first laser signal to a test point on the vibration panel 13, such as a centroid and a geometric center. The first laser signal may include a sweep frequency signal generated by a distortion analyzer in a frequency range of 20-20000 Hz. The first laser signal may be focused on the test point at a first angle (e.g., 90°). The laser vibrometer may image a laser light spot formed on the test point at a second angle, i.e., a second laser signal formed after the first laser signal is reflected or scattered by the vibration panel 13 may be captured by a laser receiver such as a CCD. Compared to a non-vibration natural state, a relative position of the test point in a vibration process of the vibration panel 13 may change, i.e., a relative position of the laser light spot may change, causing the second angle to change accordingly. An imaging position of the laser light spot on the laser receiver may change accordingly, and the vibration displacements of the vibration panel 13 at different times may be calculated, thereby the frequency response curve of the vibration of the vibration panel 13 may be obtained.

It should be noted that the non-wearing state described in the present disclosure may be defined as that the earphone 100 is not worn by a user. For example, the earphone 100 is not worn to a wearing position. The support component 20 may be fixed. For example, the support component 20 may be fixed on a laser vibrometer fixing table, and the core module 10 may be in a cantilevered state with respect to a fixing point of the support component 20. In this case, the vibration panel 13 may not be in contact with other media (e.g., the skin of the user) other than being structurally connected or in contact with the core module 10.

The main difference with the above embodiment is that in this embodiment, referring to FIG. 5, the core module 10 may also include an auxiliary structure 16 connected with the vibration panel 13. In other words, along the vibration direction of the transducer device 12, the auxiliary structure 16 and the vibration panel 13 may be located on a same side of the core housing 11. For example, in the wearing state, the auxiliary structure 16 and the vibration panel 13 may be located on a side toward the skin of the user. Since the auxiliary structure 16 is connected with the vibration panel 13, the vibration panel 13 may drive the auxiliary structure 16 to vibrate when the vibration panel 13 is driven to vibrate by the transducer device 12. In this case, the auxiliary structure 16 may resonate at a certain frequency, i.e., the auxiliary structure 16 may vibrate at a large amplitude while the vibration panel 13 may vibrate less or hardly vibrate in a certain frequency range. In other words, referring to FIG. 6, the auxiliary structure 16 may be configured such that a first frequency response curve 102 of the vibration of the vibration panel 13 in the non-wearing state may have a first resonance valley V1 in the target frequency range. The target frequency range may correspond to a medium and low medium frequency range in which a frequency is relatively low, thereby attenuating a tingling sensation caused by the vibration of the vibration panel 13. The target frequency range may also correspond to a high frequency range in which a frequency is relatively high, thereby attenuating the sound leakage caused by the vibration of the vibration panel 13. The target frequency range may also correspond to other frequency ranges. In this case, the auxiliary structure 16 may be connected with the vibration panel 13, and the vibration amplitude of the vibration panel 13 in the target frequency range may be attenuated through the resonance of the auxiliary structure 16, thereby adjusting the vibration amplitude of the vibration panel 13 in the target frequency range, thereby adjusting the vibration amplitude of the vibration panel 13 in the target frequency range, and adjusting the frequency response curve of the vibration of the vibration panel 13.

Merely by way of example, the target frequency range may be from 20 Hz to 1 kHz, preferably from 50 Hz to 500 Hz, and more preferably from 50 Hz to 300 Hz. When the target frequency range is a frequency range in which a frequency is relatively low (e.g., the target frequency range is from 50 Hz to 300 Hz), with the application of the auxiliary structure 16, the auxiliary structure 16 may resonate at a certain frequency in the target frequency range, causing the vibration panel 13 to vibrate less or hardly vibrate in the corresponding frequency range, thereby attenuating the tingling sensation caused by the vibration of the vibration panel 13, and improving the comfort of the user when using the earphone 100. When the target frequency range is a frequency range in which a frequency is relatively high (e.g., the target frequency range is from 800 Hz to 1 kHz), with the application of the auxiliary structure 16, the auxiliary structure 16 may resonate at a certain frequency in that target frequency range, causing the vibration panel 13 to vibrate less or hardly vibrate in the corresponding frequency range, thereby attenuating the sound leakage caused by the vibration of the vibration panel 13.

Furthermore, in the embodiment in which the core module 10 includes the vibration damping plate 14 configured to connect the core housing 11 with the vibration panel 13, the first frequency response curve 102 may also have a second resonance valley V2. The second resonance valley V2 may be primarily derived from the resonance of the core housing 11, i.e., the core housing 11 vibrates at a large amplitude while the vibration panel 13 and the auxiliary structure 16 vibrate less or hardly vibrate in a certain frequency range. Furthermore, a central resonance frequency of the second resonance valley V2 may be less than a central resonance frequency of the first resonance valley V1, causing the central resonance frequency of the second resonance valley V2 to be shifted toward the frequency range in which the frequency is relatively low. For example, the central resonance frequency of the second resonance valley V2 may be less than 200 Hz so as to prevent the earphone 100 from "medium frequency missing".

It should be noted that in the present disclosure, the low frequency range may be in a range of 20-150 Hz, the medium frequency range may be in a range of 150-5 kHz, and the high frequency range may be in a range of 5 k-20 KHz. The medium and low frequency range may be in a range of 150-500 Hz, and a medium and high frequency range may be in a range of 500-5 KHz.

Merely by way of example, the auxiliary structure 16 may include an auxiliary panel 161 and an elastic member 162 configured to connect the auxiliary panel 161 with the vibration panel 13. In this case, when the vibration panel 13 vibrates, the auxiliary panel 161 may be driven to vibrate along with the vibration panel 13 through the elastic member 162. In the non-wearable state, the first frequency response curve 102 of the vibration of the vibration panel 13 and a second frequency response curve 103 of a vibration of the auxiliary panel 161 may have an intersection point (e.g., shown as CO in FIG. 6).

Furthermore, a reference frequency corresponding to the intersection point CO may be greater than the central resonance frequency of the first resonance valley V1. The reference frequency corresponding to the intersection point CO may be in a range of 50 Hz-1.5 kHz, preferably in a range of 80 Hz-700 Hz, and more preferably in a range of 50 Hz-300 Hz. In this case, in a range of at least a portion of frequency range in which a frequency is less than the reference frequency, a vibration amplitude of the second frequency response curve 103 may be greater than a vibration amplitude of the first frequency response curve 102. In a range of at least a portion of frequency range in which a frequency is greater than the reference frequency, the vibration amplitude of the first frequency response curve 102 may be greater than the vibration amplitude of the second frequency response curve 103. In other words, referring to FIG. 6, on a left side of the intersection point CO, at least part of the second frequency response curve 103 may be located above the first frequency response curve 102; and on a right side of the intersection point CO, at least part of the first frequency response curve 102 may be located above the second frequency response curve 102. In this case, the auxiliary structure 16 mainly has a relatively great influence on the vibration of the vibration panel 13 in the frequency range of which the frequency is less than the reference frequency corresponding to the intersection point CO and a relatively small influence on the vibration panel 13 in other frequency ranges, so as to make a targeted local adjustment to the frequency response curve of the vibration of the vibration panel 13. Accordingly, compared to the embodiment (which generally improves frequency response performance by adjusting the EQ) in which the auxiliary structure 16 is not connected with the vibration panel 13, a low frequency effect of the present disclosure is better. Specifically, in order to alleviate the tingling sensation, in the embodiment in which the auxiliary structure 16 (i.e., a single panel) is not connected with the vibration panel 13, a valley may generally appear in a low frequency of the single panel by adjusting the EQ in a later stage, which inevitably reduces the vibration of the low frequency, i.e., the single panel needs to sacrifice a low frequency vibration if in case of alleviating the tingling sensation, which may result in insufficient low frequency. In the present disclosure, the auxiliary structure 16 may be arranged on the vibration panel 13. When the auxiliary structure 16 resonates, the vibration of the vibration panel 13 may be attenuated, and surrounding air may also be driven to vibrate to produce air-conducted sound to compensate for the low frequency, thereby alleviating the tingling sensation and achieving good low frequency performance.

In some embodiments, the vibration amplitude of the second frequency response curve 103 may be greater than the vibration amplitude of the first frequency response curve 102 in a frequency range of a bandwidth of the first resonance valley V1. A reference line segment parallel to a horizontal axis of the first frequency response curve 102 may be drawn, and a vibration magnitude corresponding to the reference line segment minus the vibration magnitude corresponding to the first resonance valley V1 may be equal to 3 dB. The reference line segment and the first frequency response curve 102 may have two reference intersection points. An absolute value of a difference between frequencies corresponding to the two reference intersection points may be the bandwidth of the first resonance valley V1. In other words, in the frequency range of the bandwidth of the first resonance valley V1, the auxiliary structure 16 may have a relatively great influence on the vibration of the vibration panel 13. For example, in the frequency range of the bandwidth of the first resonance valley V1, the vibration panel 13 may reduce the tingling sensation significantly, and the air-conducted sound generated by the auxiliary structure 16 may compensate for the bone-conducted sound generated by the vibration panel 13.

In some embodiments, in a frequency range including the central resonance frequency of the first resonance valley V1 and having an interval length (e.g., as shown by Δf in FIG. 6) of ⅙ frequency interval, the vibration amplitude of the second frequency response curve 103 may be greater than the vibration amplitude of the first frequency response curve 102. In other words, in the frequency range including the central resonance frequency of the first resonance valley V1 and having the interval length of ⅙ frequency interval, the auxiliary structure 16 may have a relatively great influence on the vibration of the vibration panel 13. For example, in the frequency range including the central resonance frequency of the first resonance valley V1 and having the interval length of ⅙ frequency interval, the vibration panel 13 may reduce the tingling sensation significantly, and the air-conducted sound generated by the auxiliary structure 16 may compensate for the vibration of the bone-conducted sound generated by the vibration panel 13.

In general, a frequency corresponding to the first resonance valley V1 may be mainly related to a mass of the auxiliary panel 161 and a stiffness of the elastic member 162. Therefore, when either of the mass of the auxiliary panel 161 and the stiffness of the elastic member 162 changes, a position of the first resonance valley V1 on the first frequency response curve 102 may change accordingly. Merely by way of example, a ratio of the mass of the auxiliary panel 161 to the stiffness of the elastic member 162 may be in a range of $1\times10^{-6}$ $s^2$-$4\times10^{-4}$ $s^2$. In this way, when one of the mass of the auxiliary panel 161 and the stiffness of the elastic member 162 is determined, the first resonance valley V1 may be located in the target frequency range by determining or optimizing the other of the mass of the auxiliary panel 161 and the stiffness of the elastic member 162. The auxiliary panel 161 and the elastic member 162 may be two separate structural members and may be assembled together by one of connection modes such as gluing, snap-fitting, welding, or any combination thereof, which facilitates the design of the mass, the stiffness and other parameters of the auxiliary panel 161 and the elastic member 162. For example, the material of the auxiliary panel 161 and the material of the elastic member 162 may be different, the stiffness of the auxiliary panel 161 may be greater than that of the elastic member 162, and the ratio of the mass of the auxiliary panel 161 to the stiffness of the elastic member 162 may be in the range of $1\times10^{-6}$ $s^2$-$4\times10^{-4}$ $s^2$.

It should be noted that the stiffness of the elastic member 162 described in the present disclosure may be measured in the following manner. First, an edge of the elastic member 162 may be fixed on a fixing table of a tester such as a grammeter. Then a probe of the grammeter may be aligned with a test point such as a centroid and a geometrical center of the elastic member 162. Then a plurality of numerical values of displacements may be input into a control panel of the grammeter, and a correspondence relationship between a stress of the probe, a displacement, and other parameters may be recorded to plot a displacement-stress curve (of which horizontal and vertical axes represent the displacement and the stress, respectively). Finally, a slope of an inclined straight line segment of the curve is calculated to obtain the stiffness of the elastic member 162. Each displacement may represent a movement distance of the probe. A movement of the probe may cause a deformation amount of the elastic member 162. The deformation amount of the elastic member 162 caused by each displacement may not exceed a maximum deformation amount of the elastic member 162. Furthermore, since the deformation of the elastic member 162 lags behind the movement of the probe, the displacement-force curve may have a curve segment almost parallel to the horizontal axis, which may be omitted when the stiffness of the elastic member 162 is calculated. It can be seen that stiffnesses of other structures such as the vibration panel 13, the auxiliary panel 161, the vibration transmitting place 122, the vibration damping place 14, or the like in the present disclosure be obtained by measuring in the same or similar manner, which are not repeated here.

Furthermore, under the same condition, the vibration amplitudes of the vibration panel 13 and the auxiliary panel 161 may be related to masses of the vibration panel 13 and the auxiliary panel 161, respectively. Therefore, when any one of the mass of the auxiliary panel 161 and the stiffness of the elastic member 162 changes, a difference between amplitudes corresponding to the first frequency response curve 102 and the second frequency response curve 103 may change accordingly. Merely by way of example, a ratio of the mass of the auxiliary panel 161 to the mass of the vibration panel 13 may be in a range of 0.05-0.8.

Figure 7:
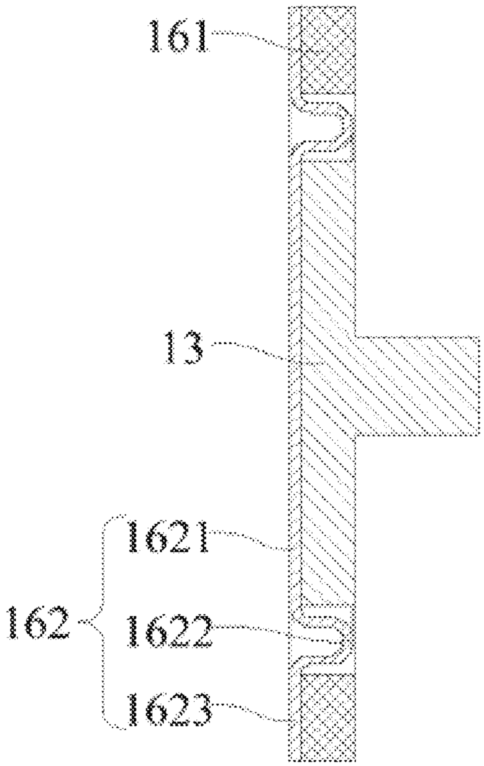
FIG. 7 is a schematic structural diagram illustrating an exemplary elastic member in FIG. 5.
Figure 8:
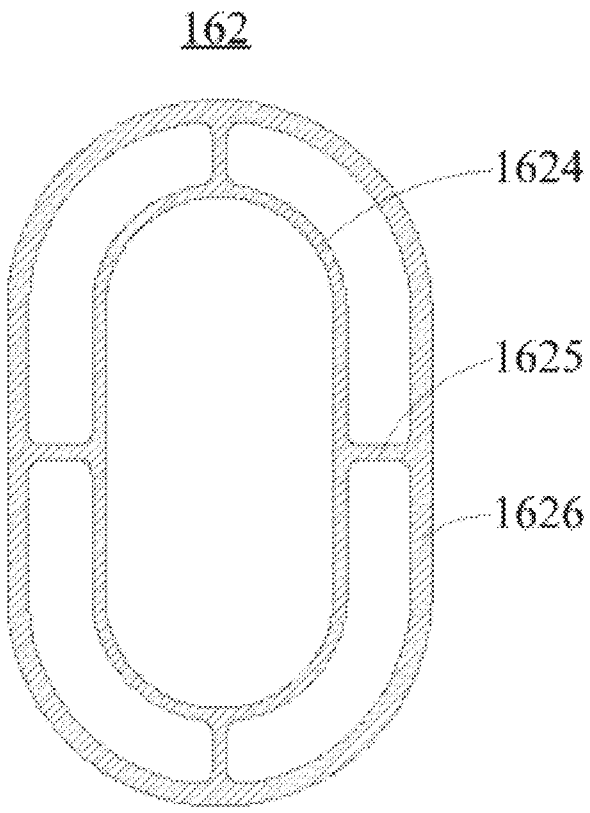
FIG. 8 is a schematic structural diagram illustrating an exemplary elastic member in FIG. 5.

Referring to FIG. 7 and FIG. 8, FIG. 7 is a schematic structural diagram illustrating an exemplary elastic member in FIG. 5. FIG. 8 is a schematic structural diagram illustrating an exemplary elastic member in FIG. 5. It should be noted that view angles of FIG. 8 and FIG. 7 may be orthogonal to each other.

For example, referring to FIG. 7, the elastic member 162 may include a first connection portion 1621, a pleated portion 1622, and a second connection portion 1623 which are integrally connected. The pleated portion 1622 may form a recessed region between the first connection portion 1621 and the second connection portion 1622. In this case, the first connection portion 1621 may be connected with the vibration panel 13, and the second connection portion 1623 may be connected with the auxiliary panel 161. In this way, compared to a planar film structure (e.g., a portion where the recessed region is located is planar), a non-planar film structure with a folded ring may contribute to an elasticity of the elastic member 162. Obviously, the stiffness of the elastic member 162 may be mainly designed by parameters such as a material, a thickness, an area, and a structural configuration of the pleated portion 1622, and the first connection portion 1621 and the second connection portion 1623 may mainly facilitate connection of the elastic member 162 with another structure. Accordingly, when the stiffness of the elastic member 162 is measured, the second connection portion 1623 may be fixed on the fixing table of the tester such as the grammeter. The probe of the grammeter may act on the first connection portion 1621 so as to measure a stiffness of the pleated portion 1622 between the first connection portion 1621 and the second connection portion 1623.

Furthermore, in the wearing state, the first connection portion 1621 may be disposed on a side of the vibration panel 13 toward the skin of the user, and may play a role similar to that of the face fitting sleeve 15. Accordingly, the second connection portion 1623 may disposed on a side of the auxiliary panel 161 toward the skin of the user. The pleated portion 1622 may be located between the auxiliary panel 161 and the vibration panel 13.

For example, referring to FIG. 8, the elastic member 162 may include an inner ring 1624, a plurality of spokes 1625, and an outer ring 1626 which are integrally connected. The plurality of spokes 1625 may be spaced apart from each other and configured to connect the inner ring 1624 to the outer ring 1626 to provide a hollow structure between the inner ring 1624 and the outer ring 1626. In this case, the inner ring 1624 may be connected with the vibration panel 13, and the outer ring 1626 may be connected with the auxiliary panel 161. Each of the plurality of spokes 1625 may extend as a straight rod shape or a curved shape. Obviously, the stiffness of the elastic member 162 may be mainly designed by parameters such as materials, thicknesses, areas, structural configurations, and a count of the plurality of spokes 1625, while the inner ring 1624 and the outer ring 1626 may mainly facilitate the plurality of spokes 1625 to be connected with other structures. Therefore, when the stiffness of the elastic member 162 is measured, the outer ring 1626 may be fixed on the fixing table of the tester such as the grammeter. The probe of the grammeter may act on the inner ring 1624 to measure the stiffnesses of the plurality of spokes 1625 between the inner ring 1624 and the outer ring 1626.

Furthermore, in the wearing state, the elastic member 162 may be disposed on a side of the vibration panel 13 away from the skin of the user. It should be noted that the vibration damping place 14 and the vibration transmitting place 122 described in the present disclosure may also have the same or similar structure as the elastic member 162, respectively.

Furthermore, referring to FIG. 7 and FIG. 8, the auxiliary panel 161 may surround the vibration panel 13 to facilitate an adjustment to the second frequency response curve 103, such as producing more air-conducted sound, and realizes the appearance quality of the earphone 100.

Figure 9:
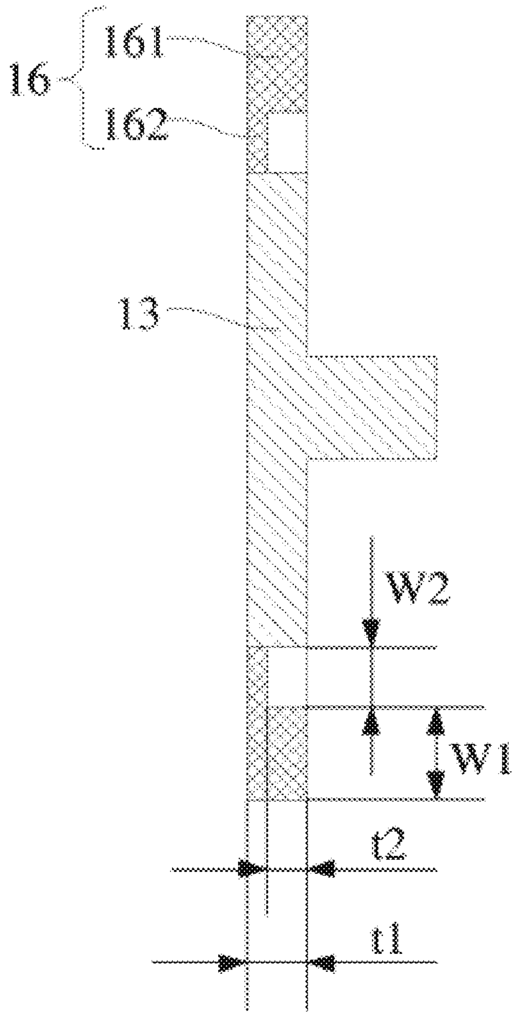
FIG. 9 is a schematic structural diagram illustrating an exemplary auxiliary structure in FIG. 5.

Referring to FIG. 9, FIG. 9 is a schematic structural diagram illustrating an auxiliary structure in FIG. 5.

The main difference with the embodiments in FIG. 7 and FIG. 8 is that in this embodiment, referring to FIG. 9, the auxiliary panel 161 and the elastic member 162 may be an integrated structural member made of a same material, and a stiffness of the auxiliary panel 161 may be greater than that of the elastic member 162. For example, the auxiliary panel 161 and the elastic member 162 may be made of a soft material such as rubber, silicone, or the like. A ratio of the stiffness of the elastic member 162 to the stiffness of the auxiliary panel 161 may be less than or equal to 0.1. In other words, the stiffness of the auxiliary panel 161 may be as large as possible to minimize a high-order mode, while the stiffness of the elastic member 162 may be as small as possible to meet the needs of connection between the auxiliary panel 161 and the vibration panel 13.

In general, a stiffness K of a structure and a Young's modulus E of a material, and a thickness t of the structure and an area S of the structure satisfy a relation: $K \propto (E \cdot t)/S$. It is clear that the smaller the area S of the structure, the greater the stiffness K of the structure; the greater the thickness t of the structure, the greater the stiffness K of the structure. Therefore, the stiffness K of the structure can be increased by increasing the Young's modulus E of the material, increasing the thickness t of the structure, and decreasing the area S of the structure, or any combination thereof.

For example, a ratio of a thickness (e.g., t1 in FIG. 9) of the auxiliary panel 161 in a vibration direction of the transducer device 12 to a thickness (e.g., t2 in FIG. 9) of the elastic member 162 in the vibration direction may be in a range of 0.5-20. A ratio of a width (e.g., W1 in FIG. 9) of the auxiliary panel 161 in a direction perpendicular to the vibration direction to a width (e.g., W2 in FIG. 9) of the elastic member 162 in the direction perpendicular to the vibration direction may be in a range of 0.5-10.

Figure 10:
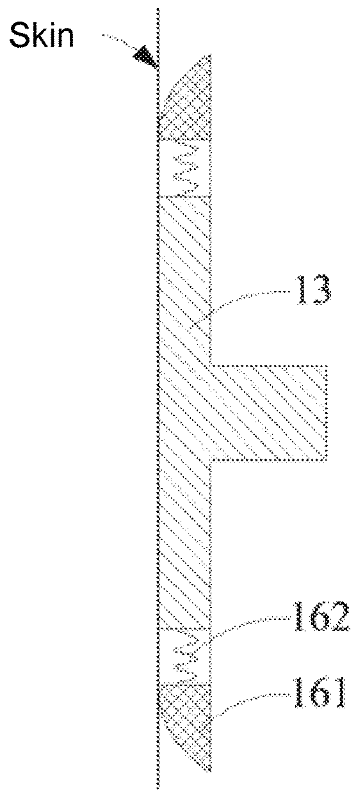
FIG. 10 is a schematic structural diagram illustrating an exemplary auxiliary structure in FIG. 5.
Figure 11:
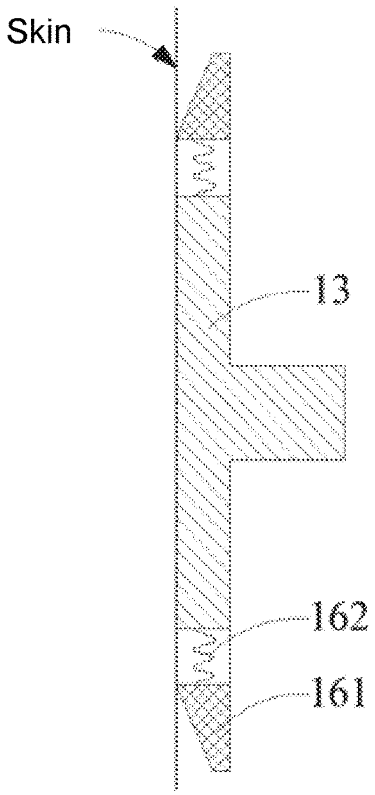
FIG. 11 is a schematic structural diagram illustrating an exemplary auxiliary structure in FIG. 5.
Figure 12:
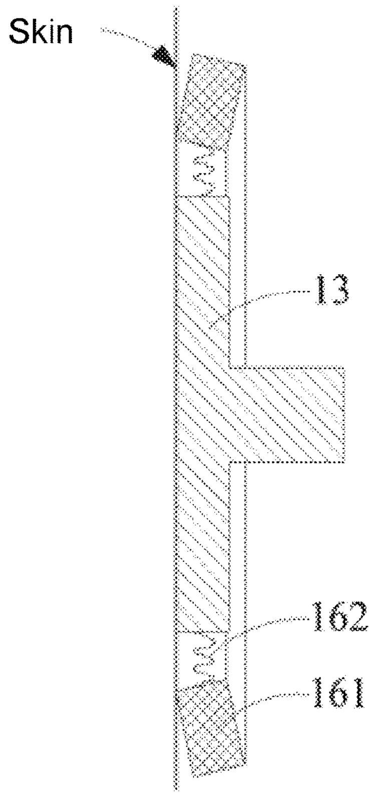
FIG. 12 is a schematic structural diagram illustrating an exemplary auxiliary structure in FIG. 5.

Referring to FIGS. 10-12, FIGS. 10-12 are schematic structural diagrams illustrating exemplary auxiliary structures in FIG. 5.

The main difference with either of the above embodiments is that in this embodiment, referring to FIGS. 10-12, in a wearing state, at least part of the auxiliary panel 161 may not be in contact with a skin of a user, allowing the auxiliary panel 161 to drive more surrounding air to vibrate to generate air-conducted sound, thereby better compensating for bone-conducted sound generated by the vibration panel 13. In this case, while the auxiliary structure 16 attenuates a vibration magnitude of the vibration panel 13 in a target frequency range due to resonance, the air-conducted sound generated by the auxiliary panel 161 may also compensate for the bone-conducted sound generated by the vibration panel 13, thereby realizing a listening effect of the earphone 100.

For example, referring to FIGS. 10-12, the auxiliary panel 161 is provided with a surface toward the skin of the user. At least part of the surface may not be in contact with the skin of the user in the wearing state. As illustrated in FIG. 10, at least part of the surface may be a curved surface. As illustrated in FIG. 11, at least part of the surface may be a straight surface. In addition, referring to FIG. 12, the auxiliary panel 161 may also be bent with respect to the vibration panel 13 and extend in a direction away from the skin of the user in the wearing state.

Based on the related descriptions above, in addition to a basic structure of the core module 10, the core module 10 provided in the present disclosure may also include the auxiliary panel 161 connected with the vibration panel 13. For example, the auxiliary panel 161 may be connected with the vibration panel 13 through the elastic member 162. In the non-wearing state, the first frequency response curve 102 of the vibration of the vibration panel 13 and the second frequency response curve 103 of the vibration of the auxiliary panel 161 may have the intersection point (e.g., shown as CO in FIG. 6). Furthermore, in a range of at least a portion of frequency range in which a frequency is less than a reference frequency corresponding to the intersection point CO, the vibration amplitude of the second frequency response curve 103 may be greater than the vibration amplitude of the first frequency response curve 102. In a range of at least a portion of frequency range in which the frequency is greater than the reference frequency, the vibration amplitude of the first frequency response curve 102 may be greater than the vibration amplitude of the second frequency response curve 103. In other words, in the frequency range of the bandwidth of the first resonance valley V1, the vibration amplitude of the second frequency response curve 103 may be greater than the vibration amplitude of the first frequency response curve 102. In this way, the auxiliary panel 161 may mainly have a relatively great influence on the vibration of the vibration panel 13 in the frequency range of which the frequency is less than the reference frequency corresponding to the intersection point CO and a relatively small influence on the vibration panel 13 in other frequency ranges, so as to make a targeted local adjustment to the frequency response curve of the vibration of the vibration panel 13. The reference frequency corresponding to the intersection point CO may be in a range of 50 Hz-1.5 kHz, preferably in a range of 80 Hz-700 Hz, and more preferably in a range of 50 Hz-300 Hz. Furthermore, a ratio of a mass of the auxiliary panel 161 to a stiffness of the elastic member 162 may be in a range of $1\times10^{-6}\ s^2$-$4\times10^{-4}\ s^2$. It should be noted that compared to the embodiment (which generally improves the frequency response performance by adjusting the EQ) in which the auxiliary structure 16 is not connected with the vibration panel 13, the low frequency effect of the present disclosure may be better.

Similarly, in addition to the basic structure of the core module 10, the core module 10 provided in the present disclosure may further include the auxiliary panel 161 and the elastic member 162 configured to connect the auxiliary panel 161 with the vibration panel 13. When the vibration panel 13 vibrates, the auxiliary panel 161 may be driven to vibrate along with the vibration panel 13 through the elastic member 162. In this way, the auxiliary panel 161 may resonate at a certain frequency, i.e., the auxiliary structure 16 may vibrate at a large amplitude, while the vibration panel 13 may vibrate less or hardly vibrate in a certain frequency range, so that a tingling sensation caused by the vibration of the vibration panel 13 may be attenuated in a medium and low frequency range in which a frequency is relative low, or sound leakage caused by the vibration of the vibration panel 13 may be attenuated in a high frequency range in which a frequency is relative high, and other technical effects may also be realized in other frequency ranges. The ratio of the mass of the auxiliary panel 161 to the stiffness of the elastic member 162 may be in the range of $1\times10^{-6}$ $s^2$-$4\times10^{-4}$ $s^2$. Furthermore, the auxiliary panel 161 may be provided with a surface toward the skin of the user. At least part of the surface may not be in contact with the skin of the user in the wearing state, allowing the auxiliary panel 161 to drive the surrounding air to vibrate, which in turn generates the air-conducted sound. In this way, while the auxiliary panel 161 attenuates the vibration magnitude of the vibration panel 13 due to the resonance, the air-conducted sound generated by the auxiliary panel 161 may also compensate for the bone-conducted sound generated by the vibration panel 13, thereby realizing the listening effect of the earphone 100. Meanwhile, the auxiliary panel 161 may not introduce or introduce only a small amount of bone-conducted vibration that causes the tingling sensation to the user. In addition, the auxiliary panel 161 may surround the vibration panel 13 and may be located on a same side of the transducer device 12 with the vibration panel 13 in the vibration direction of the transducer device 12, thereby facilitating the generation of the bone-conducted and/or the air-conducted sound, and compensating for the vibration of the vibration panel 13.

The foregoing is only a part of the embodiments of the present disclosure, and is not intended to limit the scope of protection of the present disclosure. Any equivalent device or equivalent process transformations utilizing the contents of the specification of the present disclosure and the accompanying drawings, or applying them directly or indirectly in other related fields of technology are also included in the scope of protection of the present disclosure.

What is claimed is:

1. An earphone, comprising a support component and a core module connected with the support component, wherein the support component is configured to support the core module to be worn to a wearing position, the core module includes a core housing, a transducer device, and a vibration panel, the transducer device is disposed in an accommodating cavity of the core housing, the vibration panel is connected with the transducer device and configured to transmit a mechanical vibration generated by the transducer device to a user, the core module further includes an auxiliary structure connected with the vibration panel, and the auxiliary structure is configured such that a first frequency response curve of a vibration of the vibration panel in a non-wearing state has a first resonance valley in a target frequency range.

2. The earphone of claim 1, wherein the target frequency range is from 20 Hz to 1 KHz.

3. The earphone of claim 1, wherein the auxiliary structure includes an auxiliary panel and an elastic member connecting the auxiliary panel with the vibration panel, in the non-wearable state, the first frequency response curve and a second frequency response curve of a vibration of the auxiliary panel have an intersection point, and a reference frequency corresponding to the intersection point is greater than a central resonance frequency of the first resonance valley;

in a range of at least a portion of frequency range in which a frequency is less than the reference frequency, a vibration amplitude of the second frequency response curve is greater than a vibration amplitude of the first frequency response curve, and in a range of at least a portion of frequency range in which the frequency is greater than the reference frequency, the vibration amplitude of the first frequency response curve is greater than the vibration amplitude of the second frequency response curve.

4. The earphone of claim 3, wherein the reference frequency is in a range of 50 Hz-1.5 KHz.

5. The earphone of claim 3, wherein in a frequency range of a bandwidth of the first resonance valley, the vibration amplitude of the second frequency response curve is greater than the vibration amplitude of the first frequency response curve;

a reference line segment parallel to a horizontal axis of the first frequency response curve is drawn, a magnitude of a vibration corresponding to the reference line segment minus a magnitude of a vibration corresponding to the first resonance valley equals 3 dB, the reference line segment and the first frequency response curve have two reference intersection points, and an absolute value of a frequency difference corresponding to the two reference intersection points is the bandwidth of the first resonance valley.

6. The earphone of claim 3, wherein in a frequency range including the central resonance frequency and having an interval length of 1/6 frequency interval, the vibration amplitude of the second frequency response curve is greater than the vibration amplitude of the first frequency response curve.

7. The earphone of claim 3, wherein a ratio of a mass of the auxiliary panel to a stiffness of the elastic member is in a range of $1\times10^{-6}$ $s^2$-$4\times10^{-4}$ $s^2$.

8. The earphone of claim 3, wherein a ratio of a mass of the auxiliary panel to a mass of the vibration panel is in a range of 0.05-0.8.

9. The earphone of claim 3, wherein in a wearing state, at least part of the auxiliary panel is not in contact with a skin of the user.

10. The earphone of claim 9, wherein the auxiliary panel has a surface toward the skin of the user, and at least part of the surface is not in contact with the skin of the user in the wearing state.

11. The earphone of claim 3, wherein the auxiliary panel surrounds the vibration panel.

12. The earphone of claim 3, wherein the auxiliary panel and the elastic member are integrally molded structural members made of a same material, and a stiffness of the auxiliary panel is greater than a stiffness of the elastic member.

13. The earphone of claim 1, wherein the core module further includes a vibration damping plate, and the core housing and the vibration panel are elastically connected through the vibration damping plate.

14. The earphone of claim 13, wherein the non-wearing state is defined as that the earphone is not worn to the wearing position, the support component is fixed, and the core module is cantilevered relative to the support component; and the first frequency response curve further has a second resonance valley, and a central resonance frequency of the second resonance valley is less than a central resonance frequency of the first resonance valley.

15. The earphone of claim 1, wherein in the non-wearable state, the first frequency response curve and a second frequency response curve of a vibration of the auxiliary panel have an intersection point, and a reference frequency corresponding to the intersection point is greater than a central resonance frequency of the first resonance valley.

16. The earphone of claim 1, wherein in the non-wearable state, the first frequency response curve and a second frequency response curve of a vibration of the auxiliary panel have an intersection point, in a range of at least a portion of frequency range in which a frequency is less than a reference frequency corresponding to the intersection point, a vibration amplitude of the second frequency response curve is greater than a vibration amplitude of the first frequency response curve.

17. The earphone of claim 1, wherein in the non-wearable state, the first frequency response curve and a second frequency response curve of a vibration of the auxiliary panel have an intersection point, in a range of at least a portion of frequency range in which a frequency is greater than a reference frequency corresponding to the intersection point, a vibration amplitude of the first frequency response curve is greater than a vibration amplitude of the second frequency response curve.

18. The earphone of claim 1, wherein when the vibration panel vibrates, the auxiliary structure is driven to vibrate along with the vibration panel.

19. An earphone, comprising a support component and a core module connected with the support component, wherein the support component is configured to support the core module to be worn to a wearing position, the core module includes a core housing, a transducer device, and a vibration panel, the transducer device is disposed in an accommodating cavity of the core housing, the vibration panel is connected with the transducer device and configured to transmit a mechanical vibration generated by the transducer device to a user, the core module further includes an auxiliary panel connected with the vibration panel, in a non-wearing state, a first frequency response curve of a vibration of the vibration panel and a second frequency response curve of a vibration of the auxiliary panel have an intersection point, in a range of at least a portion of frequency range in which a frequency is less than a reference frequency corresponding to the intersection point, a vibration amplitude of the second frequency response curve is greater than a vibration amplitude of the first frequency response curve, and in a range of at least a portion of frequency range in which the frequency is greater than the reference frequency, the vibration amplitude of the first frequency response curve is greater than the vibration amplitude of the second frequency response curve.

20. An earphone, comprising a support component and a core module connected with the support component, wherein the support component is configured to support the core module to be worn to a wearing position, the core module includes a core housing, a transducer device, and a vibration panel, the transducer device is disposed in an accommodating cavity of the core housing, the vibration panel is connected with the transducer device and configured to transmit a mechanical vibration generated by the transducer device to a user, and the core module further includes an auxiliary panel and an elastic member connecting the auxiliary panel with the vibration panel, wherein the auxiliary panel is only connected to the vibration panel via the elastic member.

* * * * *